(12) United States Patent
Rama et al.

(10) Patent No.: US 10,218,015 B2
(45) Date of Patent: Feb. 26, 2019

(54) ANODE BLEED CONTROL IN A FUEL CELL STACK

(71) Applicant: INTELLIGENT ENERGY LIMITED, Loughborough (GB)

(72) Inventors: Pratap Rama, Loughborough (GB); Paul Leonard Adcock, Loughborough (GB); Jignesh Karsan Devshi Patel, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 217 days.

(21) Appl. No.: 15/023,994

(22) PCT Filed: Sep. 29, 2014

(86) PCT No.: PCT/GB2014/052932
§ 371 (c)(1),
(2) Date: Mar. 22, 2016

(87) PCT Pub. No.: WO2015/044684
PCT Pub. Date: Apr. 2, 2015

(65) Prior Publication Data
US 2016/0240875 A1    Aug. 18, 2016

(30) Foreign Application Priority Data

Sep. 30, 2013   (GB) .................................. 1317273.9

(51) Int. Cl.
*H01M 8/04*        (2016.01)
*H01M 8/04746*     (2016.01)
(Continued)

(52) U.S. Cl.
CPC ... *H01M 8/04753* (2013.01); *H01M 8/04097* (2013.01); *H01M 8/04164* (2013.01);
(Continued)

(58) Field of Classification Search
CPC ........................................................ H01M 8/04
See application file for complete search history.

(56) References Cited

U.S. PATENT DOCUMENTS

2002/0110710 A1   8/2002  Keskula et al.
2005/0066680 A1*  3/2005  Hobmeyr ........... H01M 8/04111
                                                62/259.2
(Continued)

FOREIGN PATENT DOCUMENTS

CA        2488564        5/2006
CN      101110483 A      1/2008
(Continued)

OTHER PUBLICATIONS

International Search Report and Written Opinion dated Jan. 21, 2015 in International Application No. PCT/GB2014/052932.
(Continued)

*Primary Examiner* — Jacob B Marks
(74) *Attorney, Agent, or Firm* — Baker Hostetler LLP

(57) ABSTRACT

An electrochemical fuel cell assembly comprises a fuel cell stack having a fuel delivery inlet and a fuel delivery outlet. The fuel cell stack further includes a number of fuel cells each having a membrane-electrode assembly and a fluid flow path coupled between the fuel delivery inlet and the fuel delivery outlet for delivery of fuel to the membrane-electrode assembly. A fuel delivery conduit is coupled to the fuel delivery inlet for delivery of fluid fuel to the stack. A bleed conduit is coupled to the fuel delivery outlet for venting fluid out of the stack. A variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance
(Continued)

of fuel cells in the stack. The variable orifice flow control device may be coupled to a recirculation conduit and may be configured to dynamically vary a proportion of fluid from the fuel delivery outlet passing into the bleed conduit as a function of the control parameters.

12 Claims, 6 Drawing Sheets

(51) Int. Cl.

| | |
|---|---|
| *H01M 8/04089* | (2016.01) |
| *H01M 8/04119* | (2016.01) |
| *H01M 8/04223* | (2016.01) |
| *H01M 8/2457* | (2016.01) |
| *H01M 8/241* | (2016.01) |
| *H01M 8/0432* | (2016.01) |
| *H01M 8/0438* | (2016.01) |
| *H01M 8/0444* | (2016.01) |
| *H01M 8/04492* | (2016.01) |
| *H01M 8/04537* | (2016.01) |
| *H01M 8/1018* | (2016.01) |

(52) U.S. Cl.
CPC ... *H01M 8/04179* (2013.01); *H01M 8/04231* (2013.01); *H01M 8/04761* (2013.01); *H01M 8/241* (2013.01); *H01M 8/2457* (2016.02); *H01M 8/045* (2013.01); *H01M 8/04328* (2013.01); *H01M 8/04388* (2013.01); *H01M 8/04447* (2013.01); *H01M 8/04552* (2013.01); *H01M 8/04559* (2013.01); *H01M 8/04641* (2013.01); *H01M 8/04649* (2013.01); *H01M 2008/1095* (2013.01)

(56) References Cited

U.S. PATENT DOCUMENTS

| | | | |
|---|---|---|---|
| 2005/0147863 A1* | 7/2005 | Hiramatsu | H01M 8/04097 429/413 |
| 2008/0014472 A1* | 1/2008 | Logan | H01M 8/04097 429/413 |
| 2008/0312849 A1 | 12/2008 | Gade et al. | |
| 2009/0117417 A1 | 5/2009 | Lienkamp et al. | |
| 2009/0280366 A1 | 11/2009 | Baaser | |
| 2009/0305100 A1 | 12/2009 | Faye et al. | |
| 2010/0055511 A1* | 3/2010 | Miyata | H01M 8/04231 429/429 |
| 2010/0151287 A1 | 6/2010 | Chowdhury | |
| 2012/0028152 A1 | 2/2012 | Harris et al. | |
| 2012/0102445 A1* | 4/2012 | Curtis | G06F 17/5068 716/119 |
| 2014/0093803 A1* | 4/2014 | Nishimura | H01M 8/04104 429/446 |

FOREIGN PATENT DOCUMENTS

| | | |
|---|---|---|
| JP | 2005-129312 A | 5/2005 |
| JP | 2005-527065 A | 9/2005 |
| JP | 2007-149423 A | 6/2007 |
| JP | 2007-280892 A | 10/2007 |
| JP | 2008-041432 A | 2/2008 |
| JP | 2008-047518 A | 2/2008 |
| JP | 2008-234991 A | 10/2008 |
| JP | 2010-062015 A | 3/2010 |
| JP | 2010-080434 A | 4/2010 |
| WO | WO 2003/019707 A1 | 3/2003 |
| WO | WO 2012-165073 * | 12/2012 |

OTHER PUBLICATIONS

Great Patent Application No. 1317273.9; Search Report; dated Mar. 19, 2014; 5 pages.
International Patent Application No. PCT/GB2014/052932; Int'l Preliminary Report on Patentability; dated Apr. 5, 2016; 7 pages.

* cited by examiner

Variables to monitor include:-

- Cell voltages (and those based on CVMs)
- RH
- Pressure (motive, suction, discharge)
- % $H_2$
- $\Delta T_{HEX}$
- $M_{liq}$, rejected
- $T_{fuel}$

ANODE BLEED CONTROL IN A FUEL CELL STACK

CROSS-REFERENCE TO RELATED APPLICATIONS

This application is a National Stage of International Patent Application No. PCT/GB2014/052932, filed Sep. 29, 2014 and claims priority to foreign application GB 1317273.9, filed Sep. 30, 2013, the contents of which are incorporated herein by reference in their entirety.

The present invention relates to fuel cells and in particular, though not exclusively, to proton-exchange membrane type fuel cells in which hydrogen is supplied to an anode side of the fuel cell, oxygen is supplied to a cathode side of the fuel cell and water by-product is produced at and removed from the cathode side of the fuel cell.

Such fuel cells comprise a proton exchange membrane (PEM) sandwiched between two porous electrodes, together comprising a membrane-electrode assembly (MEA). The MEA itself is conventionally sandwiched between: (i) a cathode diffusion structure having a first face adjacent to the cathode face of the MEA and (ii) an anode diffusion structure having a first face adjacent the anode face of the MEA. The second face of the anode diffusion structure contacts an anode fluid flow field plate for current collection and for distributing hydrogen to the second face of the anode diffusion structure. The second face of the cathode diffusion structure contacts a cathode fluid flow field plate for current collection, for distributing oxygen to the second face of the cathode diffusion structure, and for extracting water reaction product from the MEA. The anode and cathode fluid flow field plates conventionally each comprise a rigid, electrically conductive material having fluid flow channels in the surface adjacent the respective diffusion structure for delivery of the reactant gases (e.g. hydrogen and oxygen) and removal of the exhaust gases (e.g. unused oxygen and water vapour).

An important consideration in the operation of such fuel cells is the management of water and inert gases such as nitrogen within the MEA and within the flow fields delivering fluids to the MEA. Membranes used in fuel cell manufacture typically allow small quantities of water and nitrogen to pass through the membrane from the cathode side to the anode side. While it is important that the MEA remains suitably hydrated during use, failure to control the MEA humidification and the level of inert gas concentration on the anode sides of the fuel cells in the stack can result in dilution of the fuel and/or blockage of the flow paths and hence poor electrical cell performance and/or premature cell failure.

The present invention is particularly related to the management of non-fuel fluids and solids in the fuel delivery (anode) flow paths in a fuel cell stack. Non-fuel fluids may include inert gases such as nitrogen, other gaseous contaminants, water, particulates and debris that may otherwise build up in the fuel delivery flow paths within the stack.

One approach to management of the anode flow paths is to periodically purge the anode flow paths with a purge gas, such as nitrogen. This can be effective in flushing out contaminants from the anode flow paths, but has potential disadvantages in disrupting electrical output of the fuel cell and requiring a local source of nitrogen purge gas. Another approach is to periodically purge the anode with a higher than normal flow of the fuel gas, e.g. hydrogen, by opening a purge valve or bleed valve coupled to the stack outlet. This has a potential disadvantage of being wasteful of fuel. The frequency and duration of the periodic purge may generally be governed by a control model which estimates hydrogen and/or nitrogen concentration in the anode side of the fuel cell stack based on known properties of the stack, or which uses a hydrogen concentration measurement and/or cell voltage measurements to determine when a periodic bleed is necessary.

It is an object of the present invention to provide an alternative way to purge anode flow paths of non-fuel fluid and/or solid contaminants.

According to one aspect, the present invention provides an electrochemical fuel cell assembly comprising:

a fuel cell stack having a fuel delivery inlet and a fuel delivery outlet, the fuel cell stack further comprising a number of fuel cells each having a membrane-electrode assembly and a fluid flow path coupled between the fuel delivery inlet and the fuel delivery outlet for delivery of fuel to the membrane-electrode assembly;

a fuel delivery conduit coupled to the fuel delivery inlet for delivery of fluid fuel to the stack;

a bleed conduit coupled to the fuel delivery outlet for venting fluid out of the stack;

a variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack.

The electrochemical fuel cell assembly may include a recirculation conduit coupled between the fuel delivery outlet and the fuel delivery conduit for recirculating fluid from the fuel delivery outlet to the fuel delivery inlet, the fuel delivery conduit, the recirculation conduit and the fuel flow paths in the fuel cell stack together defining a fuel circuit; wherein the variable orifice flow control device is coupled to the recirculation conduit and is configured to dynamically vary a proportion of fluid from the fuel delivery outlet passing into the bleed conduit as a function of the control parameters.

The variable orifice flow control device may be further configured to dynamically vary the proportion of fluid passing into the bleed conduit as a function of one or more of the control parameters: (vi) pressure in the fuel circuit; (vii) temperature in the recirculation conduit. The recirculation conduit may include one or both of: a water separator configured to extract liquid water from the fuel circuit; and a condenser configured to extract water vapour from the fuel circuit. The variable orifice flow control device may be further configured to dynamically vary the proportion of fluid passing into the bleed conduit as a function of the quantity of water and/or water vapour being extracted from the fuel circuit. The recirculation conduit may be coupled to the fuel delivery conduit by way of an ejector in the fuel delivery conduit, the recirculation conduit being coupled to a suction port of the ejector and the fuel delivery inlet being coupled to a discharge port of the ejector. The ejector may be a variable orifice ejector. The electrochemical fuel cell assembly may include one or more of: a hydrogen concentration sensor; a humidity sensor; a pressure sensor; a temperature sensor in the fuel circuit. The sensor or sensors may be located in the fuel delivery conduit and/or in the recirculation conduit. The electrochemical fuel cell assembly may include a humidity sensor, a temperature sensor and a pressure sensor in the fuel delivery conduit between the discharge port of the ejector and the fuel delivery inlet. The electrochemical fuel cell assembly may include a hydrogen concentration sensor in the fuel delivery conduit between the discharge port of the ejector and the fuel delivery inlet. The variable orifice flow control device may further include a controller configured to vary the flow of fluid through the flow control device to the bleed conduit so as to maximise fuel utilisation efficiency. The variable orifice flow control device may further include a controller configured to vary the flow of fluid through the flow control device to the bleed conduit so as to recover fuel cell performance. The recirculation conduit may include one or both of: (i) a water separator configured to extract liquid water from the fuel circuit; (ii) a condenser configured to extract water vapour from the fuel circuit. The fuel cell assembly may further include a controller configured to modulate discharge pressure of the ejector so as to increase removal of excess water from the recirculation conduit by the water separator and/or condenser. The electrochemical fuel cell assembly may include a heat exchanger in the recirculation conduit. The variable orifice flow control device may further include a controller configured to vary the proportion of fluid from the fuel delivery outlet passing into the bleed conduit so as to maximise fuel utilisation efficiency. The variable orifice flow control device may further include a controller configured to vary the proportion of fluid from the fuel delivery outlet passing into the bleed conduit so as to recover fuel cell performance.

The electrochemical fuel cell assembly may include a fuel concentration sensor between the fuel delivery outlet and the variable orifice flow control device, the flow control device being configured to dynamically vary an amount of fluid from the fuel delivery outlet passing into the bleed conduit as a function of measured fuel concentration by the fuel concentration sensor. The fuel concentration sensor may be a hydrogen concentration sensor. The electrochemical fuel cell assembly may include, between the fuel delivery outlet and the fuel concentration sensor, one or both of: a water separator configured to extract liquid water; and a condenser configured to extract water vapour.

The variable orifice flow control device may comprise a valve with a variable orifice controlled by a stepper motor to thereby control an amount of fluid passing through the flow control device. The variable orifice flow control device may comprise a electromagnet drivable by a pulse width modulated, variable duty cycle control signal to vary the position of a mechanical restrictor in the flow control device to thereby control an amount of fluid passing through the flow control device.

The electrochemical fuel cell assembly may include an electrochemical impedance spectroscopy analysis system configured to apply an AC current or voltage modulation to at least one cell output, the flow control device being configured to dynamically vary an amount of fluid from the fuel delivery outlet passing into the bleed conduit as a function of measured impedance of one or more cells at one or more frequencies.

According to another aspect, the present invention provides a method of operating an electrochemical fuel cell assembly comprising:
  providing a fuel cell stack with a fuel delivery inlet and a fuel delivery outlet, a number of fuel cells each having a membrane-electrode assembly and a fluid flow path coupled between the fuel delivery inlet and the fuel delivery outlet for delivery of the fuel to the membrane-electrode assembly;
  delivering fuel to the fuel cell stack via a fuel delivery conduit coupled to the fuel delivery inlet;
  venting fluid out of the stack via a bleed conduit coupled to the fuel delivery outlet;
  controlling a variable orifice flow control device coupled to the bleed conduit to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack.

According to another aspect, the present invention provides a computer program for use in an electrochemical fuel cell assembly having a fuel cell stack with a fuel delivery inlet and a fuel delivery outlet and a number of fuel cells each having a membrane-electrode assembly and a fluid flow path coupled between the fuel delivery inlet and the fuel delivery outlet for delivery of fuel to the membrane-electrode assembly, the fuel cell assembly further comprising a fuel delivery conduit coupled to the fuel delivery inlet for delivery of fluid fuel to the stack and a bleed conduit coupled to the fuel delivery outlet for venting fluid out of the stack and a variable orifice flow control device coupled to the bleed conduit;
  the computer program configured, when loaded into a controller of the electrochemical fuel cell assembly, to cause the controller to provide output signals to control the variable orifice control device to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack.

The computer program may be configured for use in the electrochemical fuel cell assembly further comprising a recirculation conduit coupled between the fuel delivery outlet and the fuel delivery conduit for recirculating fluid from the fuel delivery outlet to the fuel delivery inlet, the fuel delivery conduit, the recirculation conduit and the fuel flow paths in the fuel cell stack together defining a fuel circuit, the variable orifice flow control device being coupled to the recirculation conduit, the computer program further configured to cause the controller to provide output signals to dynamically vary a proportion of fluid from the fuel delivery outlet passing into the bleed conduit as a function of the control parameters. The computer program may be further configured to cause the controller to provide output signals to dynamically vary the proportion of fluid passing into the bleed conduit as a function of one or more of the control parameters: (vi) pressure in the fuel circuit; (vii) temperature in the recirculation conduit. The computer program may be further configured to cause the controller to provide output signals to dynamically vary the proportion of fluid passing into the bleed conduit as a function of a quantity of water and/or water vapour being extracted from the fuel circuit by one or both of a water separator and a condenser. The computer program may be further configured to receive input signals from one or more of: a hydrogen concentration sensor; a humidity sensor; a pressure sensor; a temperature sensor in the fuel circuit. The computer program may be further configured to cause the controller to provide output signals to vary the flow of fluid through the flow control device to the bleed conduit so as to maximise fuel utilisation efficiency. The computer program may be further configured to cause the controller to provide output signals to vary the flow of fluid through the flow control device to the bleed conduit so as to recover fuel cell performance. The computer program may be further configured to cause the controller to provide output signals to vary the proportion of fluid from the fuel delivery outlet passing into the bleed conduit so as to maximise fuel utilisation efficiency. The computer program may be further configured to cause the controller to provide output signals to vary the proportion of fluid from the fuel delivery outlet passing into the bleed conduit so as to recover fuel cell performance. The computer program may be further configured to cause the controller to provide output signals to dynamically vary an amount of fluid from the fuel delivery outlet passing into the bleed conduit as a function of measured fuel concentration by a fuel concentration sensor disposed between the fuel delivery outlet and the variable orifice flow control device. The computer program may be further configured to cause the controller to provide output signals to produce a pulse width modulated, variable duty cycle control signal adapted to vary the position of a mechanical restrictor in the flow control device to thereby control an amount of fluid passing through the flow control device. The computer program may further include instructions for implementing an electrochemical impedance spectroscopy analysis process by causing the controller to apply an AC current or voltage modulation to at least one cell output, and to cause the controller to dynamically vary an amount of fluid from the fuel delivery outlet passing into the bleed conduit as a function of measured impedance of one or more cells at one or more frequencies.

Embodiments of the present invention will now be described by way of example and with reference to the accompanying drawings in which.

Figure 1:
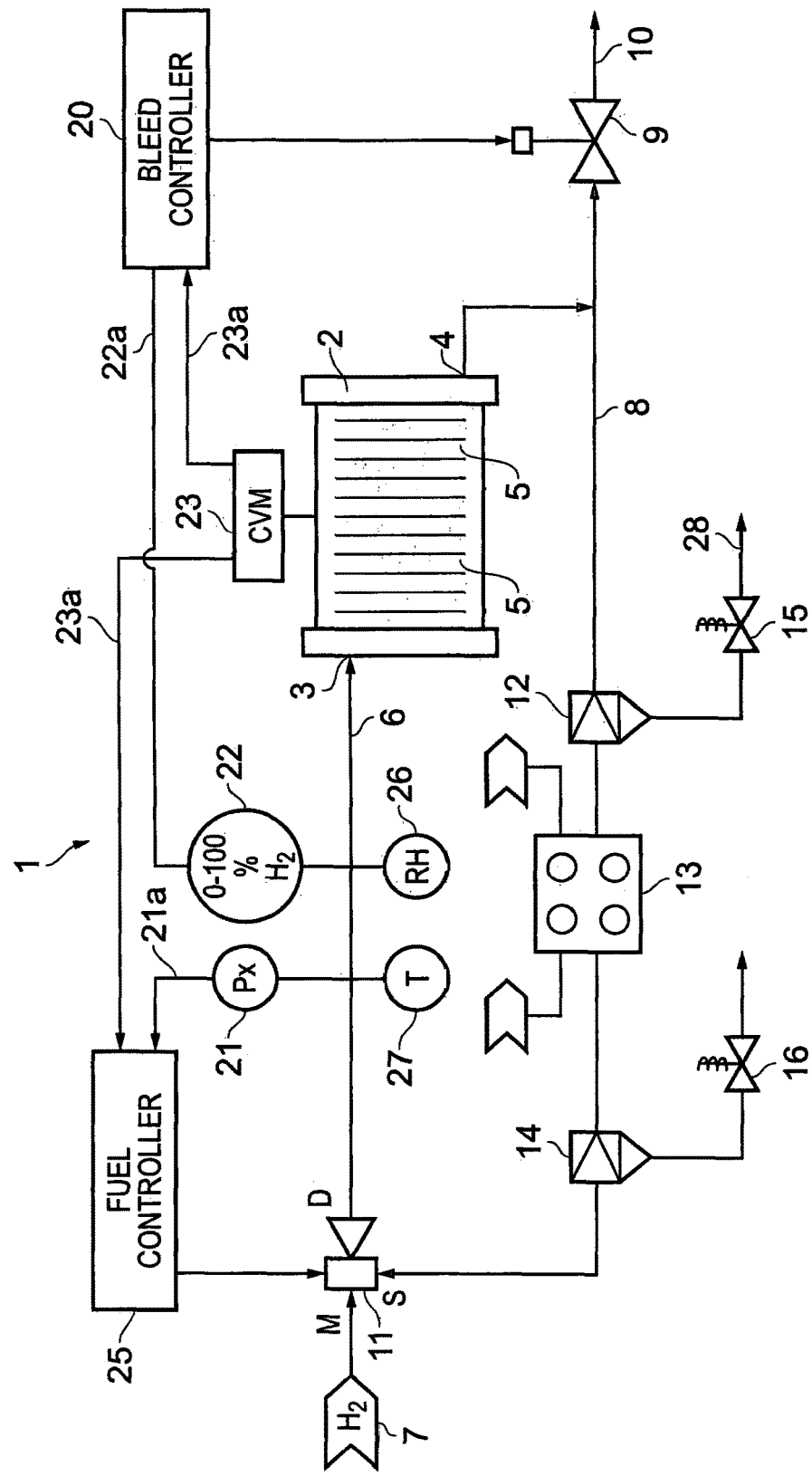
FIG. 1 shows a fuel cell assembly incorporating a bleed control circuit and a fuel recirculation circuit.

With reference to FIG. 1, an electrochemical fuel cell apparatus 1 comprises a fuel cell stack 2 having a fuel delivery inlet 3 and a fuel delivery outlet 4. The fuel cell stack 2 is constructed from a plurality of fuel cells 5 in stack formation according to well known principles. Each cell 5 has a membrane-electrode assembly (MEA), an anode fluid flow path for delivering fluid fuel to the anode side of the MEA, and a cathode fluid flow path for delivering fluid oxidant to the cathode side of the MEA. The cathode flow path and cathode fluid delivery infrastructure for delivering oxidant fluid (such as air) to the MEA and exhausting reaction by-product (such as water) from the MEA may be configured in entirely conventional manner and are not shown or described here.

The fuel delivery inlet 3 is coupled to a fuel delivery conduit 6 which is fed from a fuel supply 7 such as the hydrogen supply shown. The fuel delivery conduit thereby delivers fluid fuel to the fuel cell stack 2 where it is distributed to each cell within the stack using appropriate manifolds (not shown). The fuel delivery outlet 4 is coupled to a recirculation conduit 8 which is configured to return unused fuel back to the fuel delivery conduit 6 as will be described in more detail shortly. The recirculation conduit 8 also includes a variable orifice bleed valve 9 which is coupled to allow a variable flow of fluid to enter a bleed line 10. The variable orifice bleed valve 9 allows a continuously variable flow magnitude between a minimum flow (which may be as low as zero flow) and a maximum flow corresponding to maximum orifice size. Various types of variable orifice bleed valves 9 can be used to continuously vary the flow rate therethrough. Two exemplary types are described later in conjunction with FIGS. 4a and 4b.

The recirculation conduit 8 extends to an ejector 11 in the fuel delivery conduit 6. The ejector 11 is preferably a variable orifice ejector. The ejector 11 has a high pressure fuel line inlet M also designated as the "motive" inlet; a discharge outlet D configured to discharge fuel and recirculating fluids to the fuel delivery inlet 3 of the fuel cell stack; and a suction inlet S configured to provide a low pressure suction force to the recirculation conduit 8.

The recirculation conduit 8 preferably also includes components for the removal of water and/or water vapour from the recirculating fuel. These components may include, for example, a first water separator or condenser 12 for extracting water vapour and/or liquid water; a heat exchanger 13 for extracting heat from the recirculation fluid; and a second water separator or condenser 14 for extracting water vapour and/or liquid water. The water outlets or drains of the water separators 12, 14 may be provided with automatic drains or solenoid valves 15, 16.

The apparatus 1 further includes one or more sensors of various types. In a preferred arrangement as shown in FIG. 1, a pressure sensor 21 is connected to the fuel delivery conduit downstream of the discharge outlet D of the ejector 11. In a preferred arrangement as shown in FIG. 1, a fuel concentration sensor 22 is connected to the fuel delivery conduit downstream of the discharge outlet of the ejector 11. The fuel concentration sensor 22 is, in a preferred arrangement a full range (0-100%) hydrogen concentration sensor. The apparatus may also include a temperature sensor 27 and a humidity sensor 26 connected to the fuel delivery conduit downstream of the discharge outlet D of the ejector 11.

The apparatus 1 further includes a bleed controller 20 coupled to the variable orifice bleed valve 9 for controlling a bleed rate of the bleed valve. The bleed controller 20 is provided with one or more inputs, one of which may include a fuel concentration sensor output 22a from the fuel concentration sensor 22.

In one arrangement as shown in FIG. 1, the fuel cell stack 2 also includes a plurality of cell voltage monitoring outputs 23 which provide voltage levels from one or more individual cells 5 within the stack 2. Cell voltages can be measured for every cell in the stack or possibly for selected cells only. The bleed controller 20 may also be provided with an input corresponding to the cell voltage monitoring output 23a.

The apparatus 1 may further include a fuel controller 25 coupled to the ejector 11 for controlling the ejector variable orifice and thereby determining fuel flow and pressure at the discharge outlet D. The fuel controller 25 may be coupled to receive as input the pressure sensor output 21a and the cell voltage monitoring outputs 23a.

The bleed line 10 may lead to a vent for disposal of fuel to atmosphere, or may lead to a suitable fuel recovery apparatus.

In the fuel cell apparatus 1 as shown in FIG. 1, the fuel delivery conduit 6, the recirculation conduit 8, and the fuel flow paths within the fuel cell stack 2 may be defined as a fuel circuit. Fuel is recirculated using the ejector 11. The bleed valve 9 and the bleed line 10 are used to remove excess water and/or inert or contaminant gases from the fuel circuit which would otherwise build up within the fuel circuit by releasing a controlled amount of fuel as a carrier gas. The bleed valve 9 and the bleed line 10 may also be effective in purging particulates and debris that may otherwise build up in the fuel circuit.

Under the control of the bleed controller 20, the variable orifice bleed valve 9 dynamically varies the proportion of fluid passing into the bleed line 10 (the "bleed rate") from the fuel delivery outlet 4 in such a way as to maximise the fuel utilisation efficiency of the fuel cell stack 2. An important feature is that the control of the bleed rate is determined using one or more direct measurements from the fuel circuit and/or fuel cell stack as control parameters for the bleed controller 20. The measurements may include any one or more of (i) fuel concentration in the fuel circuit;
(ii) humidity (e.g. relative humidity) in the fuel circuit;
(iii) cell voltages in the fuel cell stack;
(iv) impedance of fuel cells in the stack;
(v) resistance of fuel cells in the stack.

The measurements for the control parameters such as fuel concentration and humidity may be taken at any suitable location in the fuel circuit, such as between the discharge outlet D and the fuel delivery inlet 3 or in the recirculation conduit upstream of the suction inlet S. Preferably, measurements are taken downstream of any water separators 12, 14, condensers or heat exchangers 13 to avoid or reduce measurement inaccuracies caused by high moisture levels.

The measurements of cell resistance can be made using the cell electrical connections otherwise used for cell voltage monitoring. Measurements of cell impedance can be made using the technique of electrochemical impedance spectroscopy (EIS) analysis. In this technique, a small AC perturbation/modulation in voltage or current is imposed on the fuel cell stack, for example via the electrical load on the stack. The corresponding AC current or voltage response of the cells in the stack is measured to determine the resistive, capacitive and/or inductive behaviour of the cell or cells at that particular AC frequency. Physical and chemical processes in the cell or cells under test have different characteristic time constants and thus these can be analysed using different frequency AC perturbations/modulations.

By way of example, the impedance analysis can determine whether the level of flooding of a cell or group of cells is increasing or decreasing and the bleed rate can be modified directly in response to the detected increase or decrease.

The electrical measurements of cell voltage, cell resistance or cell impedance can be made on an individual cell basis for one or more cells, or on one or more groups/subsets of cells, or on the whole stack of cells together.

Another measurement which may be used as a control parameter for the bleed controller 20 could be liquid removal rate which can be measured at the outlets 28 of the water separators/condensers 12, 14.

Thus, in use, the fuel cell apparatus described above provides a low-level continuous but variable purge or bleed rate, to remove excess water and/or inert gases which can otherwise compromise the hydrogen oxidation reaction that occurs in the anode catalyst layers of the cells 5 and hence degrade cell and stack performance. Purging effectively uses the fuel gas flow as a carrier gas to expel any excess water and/or inert gases and/or debris from the fuel cell stack 2 and the recirculation conduit 8, which otherwise could compromise the fuel utilisation efficiency of the fuel cell stack. The bleed rate is, however, maintained at a lowest possible level consistent with the purging requirement using a feedback mechanism provided by the sensors and bleed controller 20. Thus, in the described system, the bleed rate is minimised to reflect the sensitivity of individual cells within the fuel cell to optimise performance as a function of operational life while maximising fuel utilisation efficiency. The continuous low level bleed with control feedback using one or more sensors measuring physical conditions prevailing in the fuel circuit or fuel cell stack may offer improvements in fuel efficiency compared with other techniques that provide for intermittent periodic purges. In particular, with a continuously variable low-level purge based on real time sensor measurements, the fuel cell stack may be operated under optimal conditions at all times rather than oscillating between optimal and sub-optimal operating conditions based on intermittent purge cycles.

Control of the bleed rate at which fuel and non-fuel contaminants are purged or bled from the fuel circuit may generally be based on the following measurements:

(i) relative humidity of the discharge flow from the ejector 11 or the suction flow to the ejector;
(ii) fuel concentration in the discharge flow from the ejector 11 or suction flow to the ejector;
(iii) cell voltage balance or cell voltage profile of the fuel cell stack;
(iv) cell impedance or resistance balance/profile of the fuel cell stack
(v) electrochemical impedance spectroscopy (EIS) analysis of one or more fuel cells or the fuel cell stack.

Control of the bleed rate can also be based on the following secondary measurements:

(vi) pressure of the discharge flow from the ejector 11 or the suction flow to the ejector;
(vii) temperature of the suction flow to the ejector;
(viii) rate of liquid expulsion from the suction flow.

Some of these measurements may require additional sensors, or repositioned sensors, to those shown in the configuration of FIG. 1.

A combination of these measurements may be used as control parameters. Relative humidity measurements may be used to correct or adjust hydrogen concentration measurements. Hydrogen concentration measurements in the recirculation conduit 8 or in the fuel delivery conduit 6 downstream of the discharge outlet D will be indicative of the quantity of inert gases exiting the fuel cell stack at fuel delivery outlet 4 which will dilute the fuel (e.g. hydrogen) supply from supply 7 at the ejector 11. Increasing the bleed rate through bleed valve 9 will reduce the dilution and increase the hydrogen stoichiometry fed to the fuel delivery inlet 3. The ejector 11 may be controlled to maintain fuel delivery inlet 3 pressure, control anode stoichiometry, control rate of water separation, control thermal duty across the heat exchanger 13, maintain cell voltage balance and assist in control of bleed rate.

The bleed is actuated by the bleed controller 20 using the variable orifice bleed valve 9 which may be a needle valve or a gas injector teed into the recirculation conduit 8. The bleed gas passing through bleed line 10 may be diluted elsewhere (e.g. by coupling to a cathode exhaust line) and may be vented to atmosphere or may be recirculated in an adjoining system or may be combusted in a suitable combustor. Other methods of disposal or recovery of the bleed gas may be envisaged.

The bleed controller may serve to maintain cell voltage balance, control humidity at the fuel delivery inlet, control suction pressure at the suction inlet S, control the thermal duty across the heat exchanger 13, and control water separation.

The ejector 11 may be replaced with any form of fuel regulating device such as a pump, injector or a multi-stage ejector. The discharge pressure of the fuel regulating device can be modulated to influence the bleed rate through the bleed valve 9. The bleed controller 20 for the bleed valve 9 and the fuel controller 25 for the fuel regulating device can be close-coupled and operated as a multi-objective controller/optimiser to:

(a) regulate the bleed rate in response to fluid sensitivity of the fuel cell stack, primarily on the fuel side
(b) maximise fuel utilisation efficiency The bleed rate thereby reflects fluid sensitivity of the fuel cell stack as a function of the stack operational life. The bleed controller 20 is preferably configured with a suitable algorithm to maximise the fuel utilisation efficiency. Possible control algorithm strategies are described below with reference to FIGS. 5a and 5b.

Figure 5A:
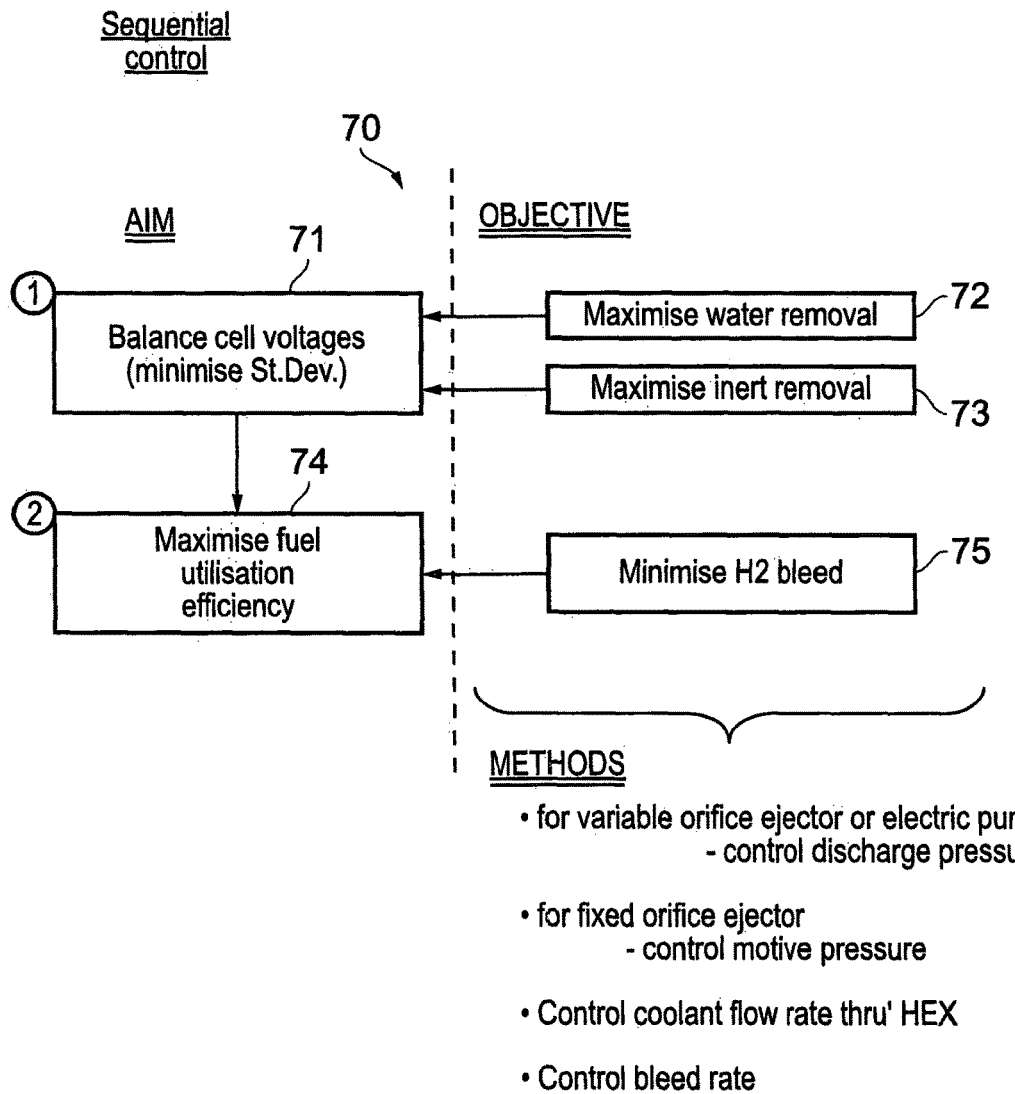
FIGS. 5a and 5b show exemplary control algorithms for controlling bleed rate using the variable orifice flow control devices.

In a first example shown in FIG. 5a, a sequential control algorithm 70 may have a first phase of operation 71 in which the bleed controller 20 operates to maximise both water removal 72 and inert gas/particle removal 73 from the anode fluid flow path/fuel circuit. In the example shown, this could be achieved by monitoring cell voltage outputs 23 to achieve a balanced cell profile, e.g. varying bleed rate to achieve a minimum variance or standard deviation in the cell voltages across the stack 2. In a second phase of operation 74, the bleed controller 20 may operate to minimise the hydrogen bleed rate 75. In the example shown, this could be achieved by monitoring fuel utilisation efficiency, e.g. monitoring hydrogen use as a function of stack power output.

The sequential control algorithm may transition cyclically between the first and second phases of operation. Other phases of operation could also be used between the first and second phases of operation. During any of the phases of operation, the controller 25 may also control and vary the pressure of discharge outlet D of the ejector 11 (or other fuel regulating device), control and vary the inlet pressure of the motive inlet M of the ejector 11 (or other fuel regulating device) and/or control and vary the coolant flow rate through the heat exchanger 13 in the recirculation conduit.

Figure 5B:
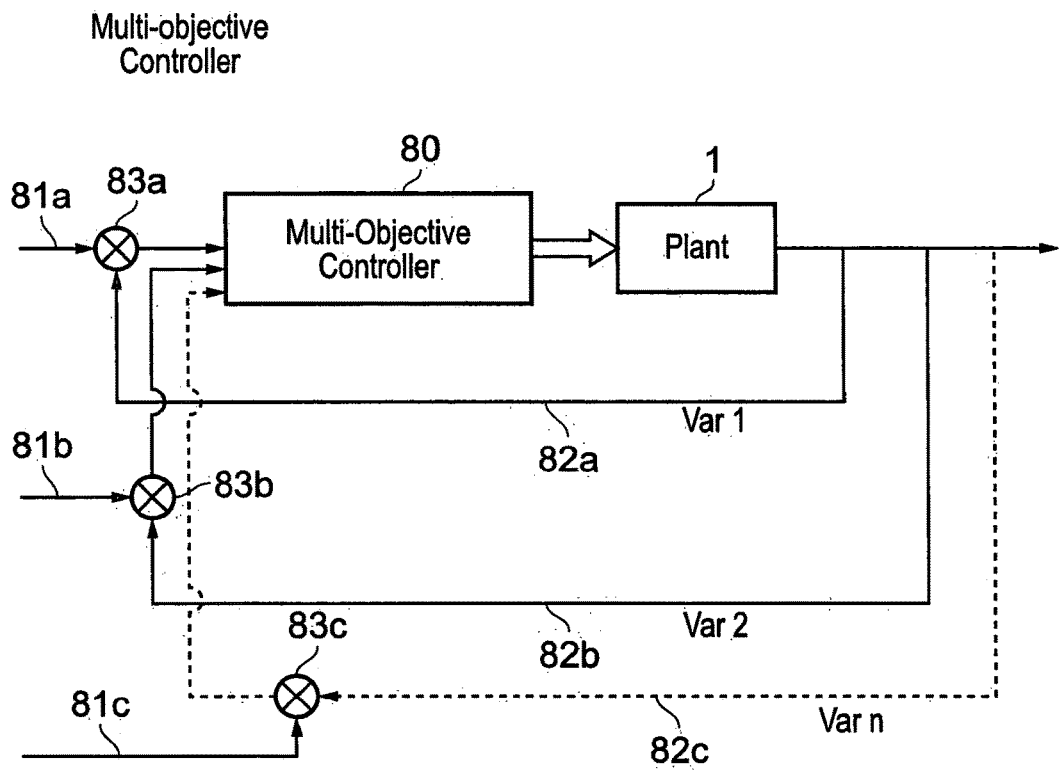

In a second example shown in FIG. 5b, a multi-objective controller 80 may be used to consider more than one objective at a given time. In such a control algorithm, various control inputs 81a, 81b, 81c may be combined with feedback inputs 82a, 82b, 82c from the fuel cell apparatus 1 in accordance with combinatorial logic 83a, 83b, 83c. Variables monitored may include any of the following: cell voltages, impedances and resistances; relative humidity; pressure at the motive inlet M, the discharge outlet D and the suction inlet S; fuel concentration; heat exchanger temperature differential; fuel temperature; and rate of removal of water ($dm_{liq,\ rejected}/dt$) from the system, e.g. from the recirculation conduit 8 using water separators 12 and/or 14.

Figure 2:
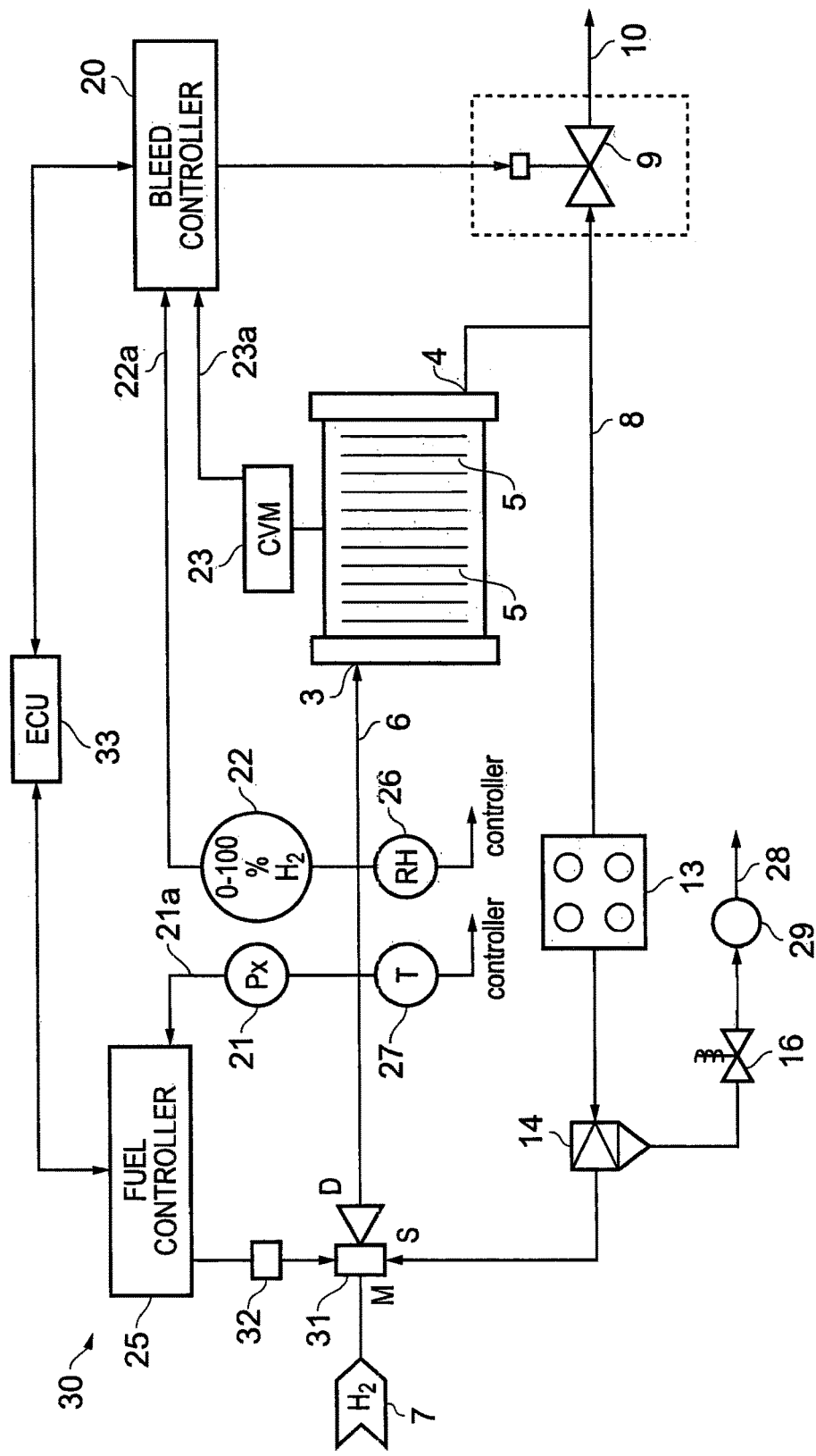
FIG. 2 shows a fuel cell assembly incorporating a bleed control circuit and a fuel recirculation circuit.

Many variations may be made to the apparatus as shown in FIG. 1 and as described in relation thereto. FIG. 2 illustrates an alternative exemplary architecture for the fuel cell apparatus 30. Corresponding features of the apparatus use the same reference numerals as in FIG. 1 and perform corresponding functions unless otherwise indicated.

In the arrangement of FIG. 2, a variable orifice ejector 31 is controlled by fuel controller 25 to primarily maintain the discharge pressure at discharge outlet D as the stack current changes. This control may be performed by controller 25 driving a stepper motor 32 which controls an internal orifice of the ejector. Therefore, control is based on the measured discharge pressure at pressure sensor 21. The bleed controller 20 controls the variable orifice bleed valve 9 coupled to the recirculation conduit leading to suction inlet S. Overall control of the entire system may be performed by engine control unit (ECU) 33 which supervises and/or coordinates the functions of the fuel controller 25 and the bleed controller 20. The input signals to the bleed controller 20 may include some or all of:

(i) the cell voltage profile from the cell voltage monitoring device outputs 23, preferably including one or more of: individual cell voltages, mean cell voltage, variance in cell voltages, minimum cell voltage in the stack, maximum cell voltage in the stack, rates of change of each parameter, worst performing cell parameters;
(ii) relative humidity as measured by relative humidity sensor 26 in the fuel delivery conduit 6;
(iii) hydrogen composition as measured by the hydrogen concentration sensor 22 in the fuel delivery conduit 6;
(iv) temperature and/or pressure as measured by temperature sensor 27 and pressure sensor 21 in the fuel delivery conduit 6;
(v) electrochemical impedance spectroscopy (EIS) analysis of the fuel cell or fuel cell stack.

In a general aspect, there is flexibility in sensor location. For example, the temperature and pressure sensors 27, 21 could be positioned in the recirculation conduit 8, preferably between the suction inlet S and any water separator or condenser or heat exchanger devices 12, 13, 14 (i.e. downstream of the devices 12, 13, 14).

The relative humidity sensor 26 is preferably located in the fuel delivery conduit 6 between the ejector 11, 31 and the fuel delivery inlet 3 where the flow will not be saturated with water vapour. A saturated or condensing flow (e.g. in the recirculation conduit 8 upstream of any water management devices 12, 14) could affect the accuracy of measurement sensor and is preferably avoided. Together with a measurement of absolute pressure and temperature at the same point it is possible to use the relative humidity measurements to determine the mole fraction of water vapour at the fuel delivery inlet 3. A 0-100% hydrogen sensor 22 is preferably installed on the same conduit to determine the overall proportion of hydrogen in the measurement stream. Subtracting the vapour mole fraction from the measured hydrogen mole fraction, it is possible to determine the inert composition of the discharge flow. These measurements can be monitored against voltage data inferred from CVM measurements as well as rates of change to determine the sensitivity of cell voltages to changes in the specific composition of the discharge gas at the fuel delivery inlet 3.

The bleed controller 20 can also be configured to adjust the bleed rate to recover cell performance according to the measured performance of the cells whilst the fuel controller 25 can also be configured to modulate the discharge pressure at the ejector 11 discharge outlet D to assist in removing excess water and inert gases from the stack. It is possible that a high pressure but low flow rate bleed may be most effective under certain circumstances.

It is possible to also affect the duty across the heat exchanger 13 by increasing the pressure in the recirculation conduit 8 by increasing the discharge pressure and reducing the bleed rate.

The water separation and recovery of the water separator is also affected by the pressure in the water separator(s) 12, 14, and it is possible to modulate the pressure in the recirculation conduit 8 to increase or decrease the amount of liquid water recovered from the recirculation conduit. Pressurisation of the recirculation conduit 8 can also be used to drive liquid water flow via the underflow of the separator 12, 14 to a liquid water holding device such as a water tank coupled to drain lines 28, via an optional liquid flow meter 29 to monitor the flow rate.

The liquid water recovered may be used for injection into the fuel cell stack for evaporative cooling in evaporatively cooled fuel cell systems. The removal of liquid water from the recirculation conduit 8 can be improved by condensing liquid water in the heat exchanger 13. It is possible that the thermal duty across the heat exchanger 13 in the recirculation conduit 8 could be used to serve hotel loads or cabin heating in vehicle systems.

The general bleed mechanism described herein can also be applied to multi-stack systems where the recirculating fuel can be cross fed to adjoining stacks.

The ejector may be substituted by a pump or other suitable flow management device.

Figure 3:
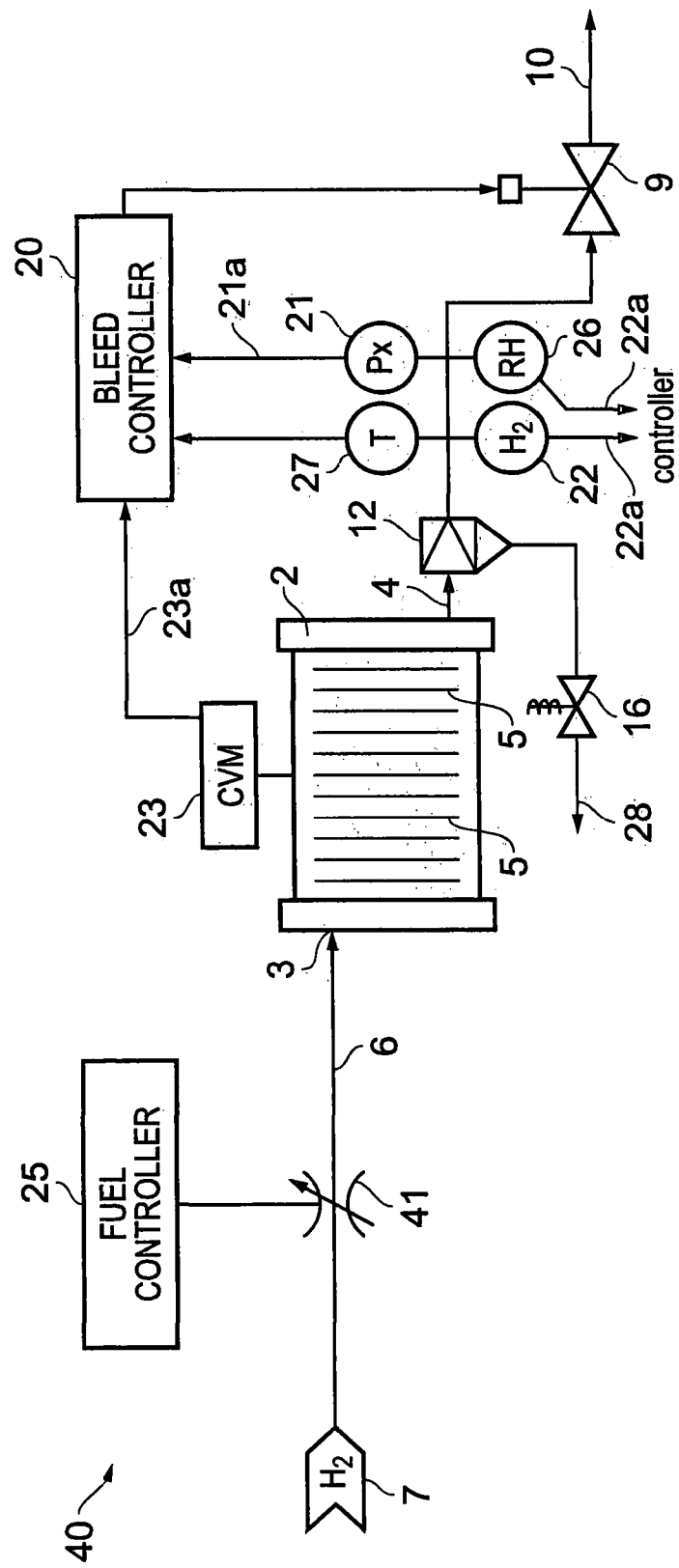
FIG. 3 shows a fuel cell assembly incorporating a bleed control circuit without a fuel recirculation circuit.

The bleed control fuel cell apparatus as described above may also be applied to a fuel cell stack system without fuel recirculation. FIG. 3 illustrates an alternative exemplary architecture for the fuel cell apparatus 40. Corresponding features of the apparatus use the same reference numerals as in FIGS. 1 and 2 and perform corresponding functions unless otherwise indicated.

In FIG. 3, the apparatus 40 has a fuel delivery conduit 6 which is coupled to a fuel source 7 via a flow/pressure regulator 41. The flow/pressure regulator may be controlled by fuel controller 25. The fuel cell stack includes a fuel delivery outlet 4 which is directly coupled via a variable orifice bleed valve 9 to a bleed line 10. In this arrangement, no fuel recirculation is provided. The variable orifice bleed valve 9 is controlled by bleed controller 20. Control of the bleed rate through the valve 9 is effected as a function of one or more of the control parameters as previously discussed in connection with FIGS. 1 and 2. In the case of the FIG. 3 arrangement, however, the relevant sensors are disposed between the fuel delivery outlet 4 and the bleed valve 9, as shown by the positions of hydrogen concentration sensor 22, humidity sensor 26, pressure sensor 21 and temperature sensor 27.

If a fuel concentration sensor 22 is used to provide fuel concentration measurements, these can be affected by changes in humidity and it may be preferable to include a water separator or condenser 12 upstream of the sensor 22. Similarly, it may also be beneficial to use a humidity sensor 26, and pressure sensor 21 and a temperature sensor 27 to provide measurements for correcting or adjusting fuel concentration measurements.

It will be understood that although the various embodiments illustrated show plural types of sensors including fuel (hydrogen) concentration sensors, pressure sensors, humidity sensors and temperature sensors as well as cell voltage monitoring, some sensors may be omitted if they are not required for the purposes of any particular bleed controller or fluid controller inputs.

The control functions ascribed to the fuel controller 25, the bleed controller 20 and the ECU 33 can be distributed or consolidated into one controller device. Some or all of the control functions of the fuel controller 25, the bleed controller 20 and the ECU 33, whether implemented in a distributed manner across the various controllers or centrally in a single controller, may be provided using a computer program implemented in one or more generic processors or in one or more application-specific processors. The control functions and computer program may generally be implemented in software, firmware or hardware or any combination thereof. The computer program may be provided on any suitable computer readable medium for loading into the controller or controllers or may be provided as a download from a remote resource on a network, or may be pre-installed in the controller or controllers.

Figure 4A:
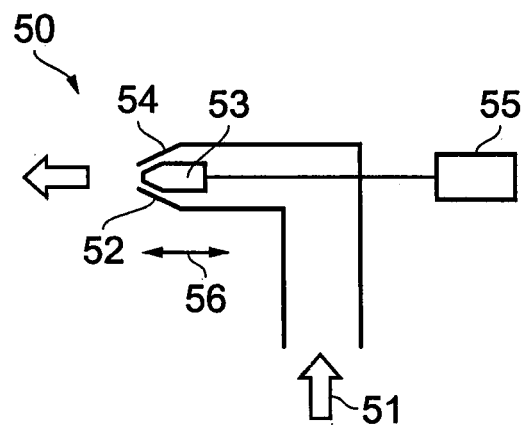
FIG. 4a and FIG. 4b show exemplary forms of variable orifice flow control devices suitable for use as bleed control devices.

As discussed earlier, various types of variable orifice flow control devices may serve as the variable orifice bleed valves 9 to continuously vary the flow rate therethrough. With reference to FIG. 4a, a variable orifice valve 50 comprises an inlet 51 and a tapering outlet nozzle 52. The outlet nozzle 52 includes a plunger 53 (e.g. a needle), the position of which is moveable relative to the outlet nozzle 52, and in particular to the tapered portion 54 of the output nozzle in the direction of the longitudinal axis of the outlet nozzle. In the example shown, the position of the plunger 53 can be varied by a stepper motor 55. As the stepper motor drives the plunger leftwards in the direction of arrow 56, flow rate can be reduced, and vice versa. The position of the plunger 53 determines the effective orifice diameter and thereby regulates flow rate. The stepper motor control of plunger position allows a very precise, finely controlled flow rate through the variable orifice bleed valve to enable the bleed controller 20 to apply precise and variable levels of continuous bleed.

Figure 4B:
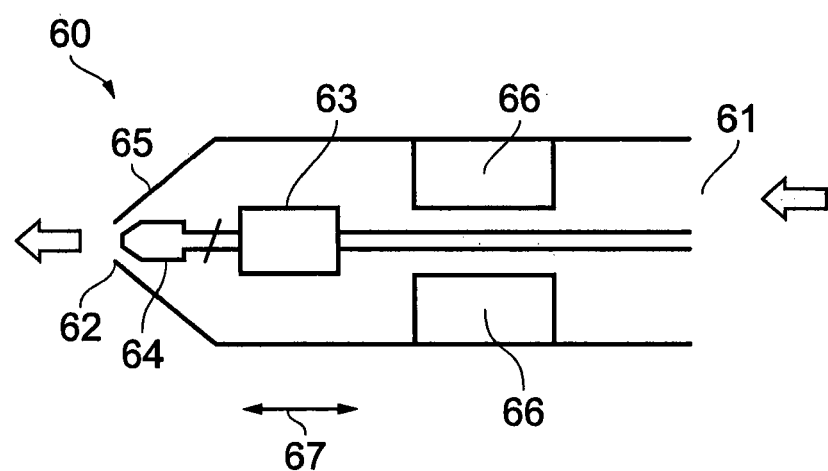

With reference to FIG. 4b, a variable orifice valve can be implemented by high frequency pulse width modulation of a solenoid valve 60. Valve 60 comprises an inlet 61 and a tapering outlet nozzle 62. The outlet nozzle 62 includes a plunger 63 with a spring-loaded end 64, the position of which plunger 63 is moveable relative to the outlet nozzle 62, and in particular to the tapered portion 65 of the outlet nozzle, in the direction of the longitudinal axis of the outlet nozzle. The position of the plunger 63 can be varied by a solenoid 66. The solenoid can be driven leftwards and rightwards in the direction of arrow 67 with a pulse width modulated control signal at, e.g. greater than 100 Hz, and with varying duty cycle, to enable the plunger position to be finely controlled and therefore allow a very precise, finely controlled flow rate through the valve 60 between fully on and fully off positions. This enables the bleed controller 20 to apply precise and variable levels of continuous bleed.

More generally, the use of a varying duty cycle, pulse width modulated signal to drive an electromagnetic actuator can be applied in various types of valve to fine control the position of a suitable mechanical restrictor such as a plunger, needle, valve or diaphragm and thereby control the discharge flow or discharge pressure of a variable orifice flow control device.

The apparatus and methods described may be applied to all types of fuel cell stacks, including evaporatively cooled stacks, liquid cooled stacks and air cooled stacks.

Other embodiments are intentionally within the scope of the accompanying claims.

The invention claimed is:

1. And electrochemical fuel cell assembly comprising:
a fuel cell stack having a fuel delivery inlet and a fuel delivery outlet, the fuel cell stack further comprising a number of fuel cells each having a membrane-electrode assembly and a fluid flow path coupled between the fuel delivery inlet and the fuel delivery outlet for delivery of fuel to the membrane-electrode assembly;
a fuel delivery conduit coupled to the fuel delivery inlet for delivery of fluid fuel to the stack;
a bleed conduit coupled to the fuel delivery outlet for venting fluid out of the stack;
a variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack; and,
in which the recirculation conduit includes one or both of: a water separator configured to extract liquid water from the fuel circuit; a condenser configured to extract water vapour from the fuel circuit, and in which the variable orifice flow control device is further configured to dynamically vary the proportion of fluid passing into the bleed conduit as a function of the quantity of water and/or water vapour being extracted from the fuel circuit.

2. An electrochemical fuel cell assembly comprising:
a fuel cell stack having a fuel delivery inlet and a fuel delivery outlet, the fuel cell stack further comprising a number of fuel cells each having a membrane-electrode assembly and a fluid flow path coupled between the fuel delivery inlet and the fuel delivery outlet for delivery of fuel to the membrane-electrode assembly;
a fuel delivery conduit coupled to the fuel delivery inlet for delivery of fluid fuel to the stack;
a bleed conduit coupled to the fuel delivery outlet for venting fluid out of the stack;
a variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack;
a recirculation conduit coupled between the fuel delivery outlet and the fuel delivery conduit for recirculating fluid from the fuel delivery outlet to the fuel delivery inlet, the fuel delivery conduit, the recirculation conduit and the fuel flow paths in the fuel cell stack together defining a fuel circuit;
wherein the variable orifice flow control device is coupled to the recirculation conduit and is configured to dynamically vary a proportion of fluid from the fuel delivery outlet passing into the bleed conduit as a function of the control parameters,
wherein the recirculation conduit is coupled to the fuel delivery conduit by way of an ejector in the fuel delivery conduit, the recirculation conduit being coupled to a suction port of the ejector and the fuel delivery inlet being coupled to a discharge port of the ejector; and,
in which the ejector is a variable orifice ejector.

3. An electrochemical fuel cell assembly comprising:
a fuel cell stack having a fuel delivery inlet and a fuel delivery outlet, the fuel cell stack further comprising a number of fuel cells each having a membrane-electrode assembly and a fluid flow path coupled between the fuel delivery inlet and the fuel delivery outlet for delivery of fuel to the membrane-electrode assembly;
a fuel delivery conduit coupled to the fuel delivery inlet for delivery of fluid fuel to the stack;
a bleed conduit coupled to the fuel delivery outlet for venting fluid out of the stack;
a variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack;
a recirculation conduit coupled between the fuel delivery outlet and the fuel delivery conduit for recirculating fluid from the fuel delivery outlet to the fuel delivery inlet, the fuel delivery conduit, the recirculation conduit and the fuel flow paths in the fuel cell stack together defining a fuel circuit;
wherein the variable orifice flow control device is coupled to the recirculation conduit and is configured to dynamically vary a proportion of fluid from the fuel delivery outlet passing into the bleed conduit as a function of the control parameters;
in which the recirculation conduit is coupled to the fuel delivery conduit by way of an ejector in the fuel delivery conduit, the recirculation conduit being coupled to a suction port of the ejector and the fuel delivery inlet being coupled to a discharge port of the ejector;
in which the ejector is a variable orifice ejector; and,
having a humidity sensor, a temperature sensor and a pressure sensor in the fuel delivery conduit between the discharge port of the ejector and the fuel delivery inlet.

4. The electrochemical fuel cell assembly of claim 1 in which the variable orifice flow control device further includes a controller configured to vary the flow of fluid through the flow control device to the bleed conduit so as to maximise fuel utilisation efficiency.

5. An electrochemical fuel cell assembly comprising:
a fuel cell stack having a fuel delivery inlet and a fuel delivery outlet, the fuel cell stack further comprising a number of fuel cells each having a membrane-electrode assembly and a fluid flow path coupled between the fuel delivery inlet and the fuel delivery outlet for delivery of fuel to the membrane-electrode assembly;
a fuel delivery conduit coupled to the fuel delivery inlet for delivery of fluid fuel to the stack;
a bleed conduit coupled to the fuel delivery outlet for venting fluid out of the stack;
a variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack;
a recirculation conduit coupled between the fuel delivery outlet and the fuel delivery conduit for recirculating fluid from the fuel delivery outlet to the fuel delivery inlet, the fuel delivery conduit, the recirculation conduit and the fuel flow paths in the fuel cell stack together defining a fuel circuit;
wherein the variable orifice flow control device is coupled to the recirculation conduit and is configured to dynamically vary a proportion of fluid from the fuel delivery outlet passing into the bleed conduit as a function of the control parameters;
in which the recirculation conduit is coupled to the fuel delivery conduit by way of an ejector in the fuel delivery conduit, the recirculation conduit being coupled to a suction port of the ejector and the fuel delivery inlet being coupled to a discharge port of the ejector; and, the recirculation conduit includes one or both of:
(i) a water separator configured to extract liquid water from the fuel circuit;
(ii) a condenser configured to extract water vapour from the fuel circuit, the fuel cell assembly further including a controller configured to modulate discharge pressure of the ejector so as to increase removal of excess water from the recirculation conduit by the water separator and/or condenser.

6. The electrochemical fuel cell assembly of claim 1 further including a heat exchanger in the recirculation conduit.

7. The electrochemical fuel cell assembly of claim 1 in which the variable orifice flow control device further includes a controller configured to vary the proportion of fluid from the fuel delivery outlet passing into the bleed conduit so as to maximise fuel utilisation efficiency.

8. The electrochemical fuel cell assembly of claim 1 further including a fuel concentration sensor between the fuel delivery outlet and the variable orifice flow control device, the flow control device being configured to dynamically vary an amount of fluid from the fuel delivery outlet passing into the bleed conduit as a function of measured fuel concentration by the fuel concentration sensor.

9. The electrochemical fuel cell assembly of claim 8 in which the fuel concentration sensor is a hydrogen concentration sensor.

10. An electrochemical fuel cell assembly comprising:
a fuel cell stack having a fuel delivery inlet and a fuel delivery outlet, the fuel cell stack further comprising a number of fuel cells each having a membrane-electrode assembly and a fluid flow path coupled between the fuel delivery inlet and the fuel delivery outlet for delivery of fuel to the membrane-electrode assembly;
a fuel delivery conduit coupled to the fuel delivery inlet for delivery of fluid fuel to the stack;
a bleed conduit coupled to the fuel delivery outlet for venting fluid out of the stack;
a variable orifice flow control device coupled to the bleed conduit configured to dynamically vary an amount of fluid from the fuel delivery outlet passing into the bleed conduit as a function of one or more of the control parameters: (i) measured fuel concentration; (ii) measured humidity; (iii) cell voltages of fuel cells in the stack; (iv) impedance of fuel cells in the stack; (v) resistance of fuel cells in the stack;
a fuel concentration sensor between the fuel delivery outlet and the variable orifice flow control device, the flow control device being configured to dynamically vary an amount of fluid from the fuel delivery outlet passing into the bleed conduit as a function of measured fuel concentration by the fuel concentration sensor; and,
having between the fuel delivery outlet and the fuel concentration sensor, one or both of a water separator configured to extract liquid water, and a condenser configured to extract water vapor.

11. The electrochemical fuel cell assembly of claim 1 in which the variable orifice flow control device comprises a valve with a variable orifice controlled by a stepper motor to thereby control an amount of fluid passing through the flow control device.

12. The electrochemical fuel cell assembly of claim 1 in which the variable orifice flow control device comprises an electromagnet drivable by a pulse width modulated, variable duty cycle control signal to vary the position of a mechanical restrictor in the flow control device to thereby control an amount of fluid passing through the flow control device.

* * * * *